March 14, 1961 W. L. STARR 2,975,332
PLASMA PROPULSION DEVICE
Filed Dec. 2, 1959
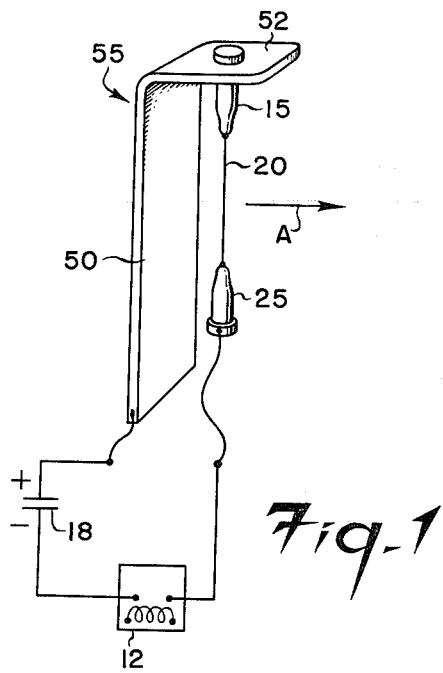
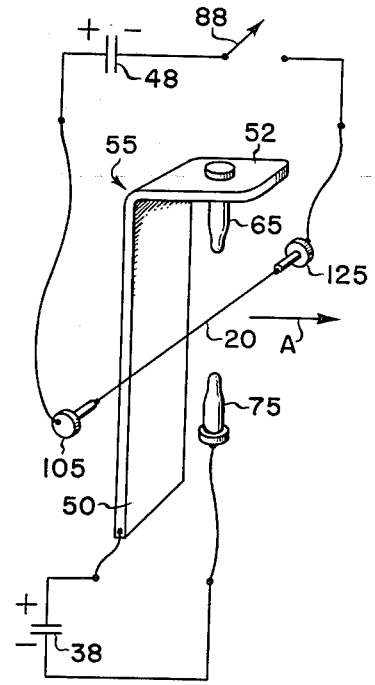
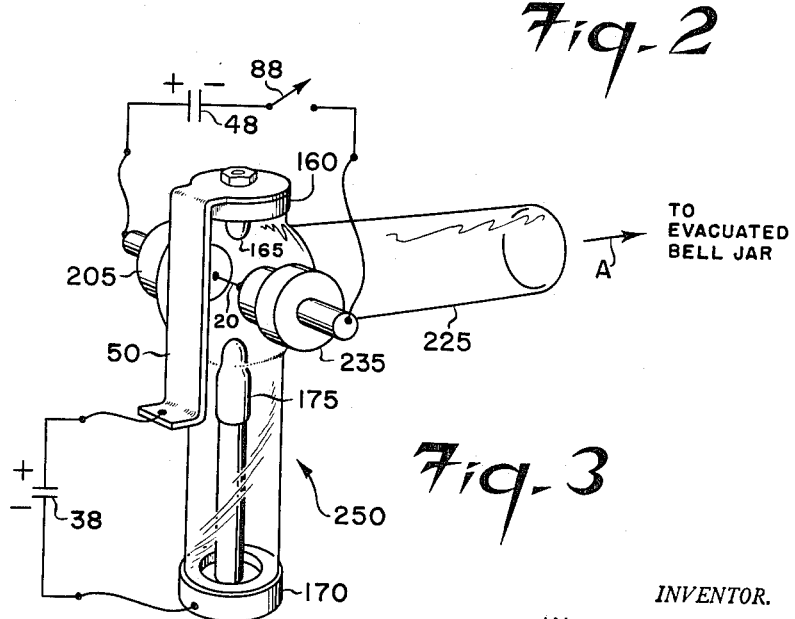
INVENTOR.
WALTER L. STARR
BY
George A. Sullivan
Agent United States Patent Office 2,975,332
Patented Mar. 14, 1961

2,975,332
PLASMA PROPULSION DEVICE
Walter L. Starr, Palo Alto, Calif., assignor to Lockheed Aircraft Corporation, Burbank, Calif.
Filed Dec. 2, 1959, Ser. No. 856,821
4 Claims. (Cl. 315—169)

This invention relates generally to propulsion devices, and more particularly to a propulsion device based on plasma acceleration principles and adapted for use in a space environment.

With the advent of space travel, the necessity of providing a propulsion system capable of yielding a very large specific impulse so as to require only a small propellant mass takes on new importance. Accordingly, it is the broad object of this invention to provide a propulsion system adaptable for space propulsion and capable of producing a specific impulse which is very much greater than is now obtainable by current chemical systems.

It is an additional object of this invention to provide improved means and methods for accelerating a plasma to high velocities.

The specific impulse of a propulsion system is defined as the ratio of thrust produced to the rate of expenditure of propellant weight. The propellant velocity is then the ratio of the thrust to the rate of expenditure of propellant mass, thereby being directly proportional to the specific impulse. It can thus be seen that the larger the specific impulse, the less propellant mass that is required, which is a most important consideration for any propulsion system to be used for space travel. The highest specific impulse currently obtainable with operational chemical systems is about 250 seconds. This corresponds to an average propellant velocity of $2.5 \times 10^5$ centimeters/second.

It is recognized that a few experiments have been performed in the prior art which are concerned with plasma acceleration techniques. (See, for example, Korneff, Nadig and Bohn, "Plasma Acceleration Experiments," Conference on Extremely High Temperatures, edited by N. Fischer and L. C. Mansur, published by John Wiley and Sons, Inc., New York, 1958.) As far as is known, none of these experiments disclose a plasma acceleration configuration which produces a sufficiently high specific impulse adaptable for space propulsion. Although a suitable plasma acceleration space propulsion system would be highly desirable, progress has been hindered because the interaction between a magnetic field and a plasma is very complex and not fully understood, making it impossible to predict which configuration will produce the highest propellant velocity and thus the highest specific impulse.

As a result of a number of experiments I have conducted, I discovered a novel configuration for a plasma acceleration device which not only provides a high specific impulse, but also, is amazingly simple and well suited for space propulsion. The configuration of the device is such that a combination of forces are caused to act on the plasma (which serves as the propellant) in such a way that it is accelerated to an unexpectedly high velocity.

In a typical embodiment of a propulsion device in accordance with the invention the vapor from an electrically exploded fine wire forms the plasma and is accelerated as a result of the interaction between the plasma and the strong forces generated by the novel plasma acceleration configuration. Experimental measurements on such a system indicate that the magnitude of the specific impulse obtained is of the order of $16 \times 10^3$ seconds, and the average propellant velocity is on the order of $16 \times 10^6$ centimeters/second; this is an increase in the value of the specific impulse and the average propellant velocity of greater than 60 to 1 over that obtainable with current chemical systems. (Comparison figures on prior art plasma acceleration experimental observations are not available).

The specific nature of the invention, as well as other objects, uses, and advantages thereof will clearly appear from the following description and from the accompanying drawing in which:

Figure 1 is a schematic and pictorial diagram of an initial embodiment of a basic plasma propulsion device in accordance with the invention.

Figure 2 is a schematic and pictorial diagram of an improved embodiment of a plasma propulsion system in accordance with the invention.

Figure 3 is a schematic and pictorial diagram of an experimental test model of a propulsion device in accordance with the invention.

Like numerals designate like elements throughout the figures of the drawing.

In Figure 1, a basic propulsion device is shown comprising two electrodes 15 and 25 between which a fine wire 20 is connected. The electrode 15 is electrically and mechanically connected to the bent over portion 52 of a metal right angle member 55 having a vertical portion 50 whose length is preferably at least sufficient to extend the length of the fine wire 20. This vertical portion 50 will be referred to as the "backstrap" and plays an important part in the propulsion device, as will hereinafter be explained.

A capacitor 18 charged to a high voltage of the order of many thousands of volts is connected in series with the fine wire 20 and the "backstrap" 50 through a conventional type of induction activated air gap switch 12.

The operation of the Figure 1 propulsion device may now be explained as follows. It must be realized that the operation of the device must take place substantially in a vacuum, as is present in space, and such an environment will be assumed for the Figure 1 system. When the air gap switch 12 is caused to break down, such as by means of an induction coil drive spark, the capacitor 18 discharges its voltage through the fine wire 20 and the "backstrap" 50. The magnitude of the capacitor 18 and the voltage thereon are chosen so that the discharge of the capacitor 18 vaporizes and heats the fine wire 20 to the plasma state. The large discharge current flowing through the "backstrap" 50 induces a strong magnetic field in the discharge area. The plasma will now be accelerated in the direction of the arrow A shown in Figure 1 as a result of the action of the following three mechanisms: (1) the joule heating of the vapor with the consequent expansion, (2) the repulsive force produced by the magnetic fields resulting from discharge current flow through the two anti-parallel conductors, and (3) the asymmetrical force exerted on a kinked conductor. The kink force in mechanism (3) is a result of a larger magnetic field on the concave side than on the convex side of a kink in a single conductor. The curve produced in the arc discharge by the magnetic field induced by the "backstrap" 50 acts as the kinked conductor.

The action of the three above described mechanisms is believed ideally suited for providing a propulsion system having a high specific impulse, particularly in view of the simplicity of the configuration. However, from a practical viewpoint, it has been found that the particular configuration shown in Figure 1 does not permit the action of these three mechanisms to be used to their fullest extent. Measurements on the propulsion device of Figure 1 indicated that the specific impulse of such a propulsion device is not very much greater than that obtained by current chemical systems. The reason for this appears to be that the plasma, which serves as the propellant, is either in a molten form or a relatively cool vapor when it leaves the electrode area, thereby failing to receive the full effect of the forces produced by the above-described three mechanisms.

Because of the limitations of the Figure 1 device, the configuration shown in Figure 2 was devised. In the Figure 2 device, instead of connecting the fine wire between the electrodes 65 and 75, as was done in the device of Figure 1, the fine wire 20 is disposed at right angles to both the axis of the electrodes 65 and 75 and the desired direction of plasma acceleration indicated at A. This disposition of the fine wire 20 is accomplished by means of the additionally provided electrodes 105 and 125 as shown. The means for vaporizing the wire 20 may thus be provided independently of the discharge circuit.

As shown in Figure 2, vaporization of the wire 20 is obtained by means of a capacitor 48 in series with a switch 88 and the fine wire 20. The size and voltage on the capacitor 48 need only be chosen so that when the switch 88 is closed, current through the wire 20 causes it to become vaporized, forming a plasma which breaks down the electrode gap between the electrodes 65 and 75.

A capacitor 38 in series with the "backstrap" 50 and the electrodes 65 and 75 provides the source of energy for the discharge, as did the capacitor 18 of Figure 1, and is charged to the many thousands of volts required for the discharge. The "backstrap" 50 should preferably have a length at least sufficient to extend the distance between the electrodes 65 and 75. Since the electrodes 65 and 75 are no longer connected together by the wire 20, there is no need for the air gap switch 12 which was used in Figure 1, the free space environment preventing voltage breakdown between the electrodes 65 and 75.

The operation of the three axis configuration of Figure 2 may now be explained as follows. As was the case with the Figure 1 device, operation must take place substantially in a vacuum. When the switch 88 is closed the capacitor 48 discharges through the fine wire 20, causing it to vaporize and form a plasma in the gap between the electrodes 65 and 75. This breaks down the gap and initiates the discharge of the capacitor 38 between the electrodes 65 and 75, causing a large current flow through the "backstrap" 50. As was described in connection with the embodiment of Figure 1, the three mechanisms (1), (2), and (3) act to accelerate the plasma in the direction of the arrow A. Because the wire 20 must be vaporized before the discharge between the electrodes 65 and 75 is initiated, the problem of the plasma not being sufficiently heated, which occurred in the Figure 1 configuration, is not present in the embodiment of Figure 2, thereby permitting full advantage to be taken of the forces produced by these three mechanisms.

The plasma is held in the discharge area by the pinch forces of the discharge until pushed into the direction of the arrow A by both the magnetic forces produced by discharge current flowing through the "backstrap" 50, and kink forces arising from the induced instability of the plasma discharge column. The result is that the plasma is accelerated to an unexpectedly high velocity, producing a specific impulse which is very much larger than is obtainable by current chemical systems.

In Figure 3 an experimental model of a propulsion device in accordance with the three-axis configuration of Figure 2 is illustrated. In order to simulate a space environment, a glass T-shaped electrode tube 250 is employed which is similar to the T-tube used in studies on magnetically driven shocks. The glass tube 250 has a heavy Pyrex wall with an outside diameter of 1-inch and an inside diameter of $11/16$-inch. The side arm 225 of the tube 250 is approximately 10 centimeters long. A first electrode 165 depends from a metal member 160 at the top of the tube 250, and a second electrode 175 depends from a metal member 170 at the bottom of the tube 250. The "backstrap" 50 is provided by means of a metal member connected to the top electrode 165 and running adjacent the outside of the tube 250 on the side of the tube 250 farthest from the side arm 225. The "backstrap" extends at least the length of the gap between the electrodes 165 and 175 as shown. Nickel electrodes 205 and 235 to which the fine wire 20 is connected are sealed into opposite ends of the tube 250 so as to dispose the fine wire 20 at right angles to both the axis of the electrodes 165 and 175 and the side arm 225. The capacitor 48 and the switch 88 are connected in series with the fine wire 20 by connections to the nickel electrodes 205 and 235 in any suitable manner. The capacitor 38 is connected to the "backstrap" 50 and to the electrode 175 by means of the extended portion 193 passing through the tube 250. Well known practice is employed to minimize inductive lead effects in order to reduce ringing.

Specific impulse and propellant velocity measurements were taken for the device of Figure 3 in which a 1.1 microfarad capacitor charged to 3,000 volts is used for the capacitor 38 and a 100 microfarad capacitor charged to 3,000 volts is used for the capacitor 48. The fine wire 20 used for these measurements is a 1-millimeter diameter tungsten wire 5 centimeters long. The side arm 221 is connected to a bell jar (not shown), the pressure in the bell jar and the T-tube 250 being kept below $10^{-5}$ mm. Hg, in order to simulate a space environment. Inside the evacuated bell jar a ballistic pendulum is provided to measure the specific impulse produced by the propulsion test device of Figure 3. The measurements resulted in extrapolated values of specific impulse and propellant velocity of the order of $16 \times 10^3$ seconds and $16 \times 10^6$ centimeters/second, respectively. In other measurements which were made the fine wire 20 varied in size from 1 to 5 millimeters and a number of different materials were used with comparable results.

In the configuration of Figure 2 and the specific test model thereof illustrated in Figure 3, the fine wire 20 serves as the primary source of propellant. It should be understood, however, that if desired the fine wire 20 could be employed merely for the purpose of initiating the discharge between the main electrodes 65 and 75 in Figure 2, the major part of the propellant being derived from vaporization of material on the electrodes or of other material provided in the vicinity of the discharge area for this purpose. It should also be understood that initiation of the main discharge may be provided in other ways than by using the fine wire 20, as will be evident to those skilled in the art. For example, small button probes are available which when activated are capable of projecting plasma into a desired area (see, for example, E. Harris, R. Theus, and W. H. Bostick, Phy. Rev., 105, 46, 1957).

It should be further understood that the sources for providing the necessary discharge and vaporizing currents may be any source or group of sources capable of yielding the high electrical currents and rapid discharge time required to produce the operation described.

For many space flight missions, such as satellite orbit transfer or long space flights in the absence of gravitational forces, accelerations of about $10^{-4}g$ (where $g$ is the acceleration of gravity) are sufficient. For vehicles of approximately 10 tons, a thrust of about 2 pounds ($10^6$ dynes) would be required. Such a thrust could be obtained with the three axis propulsion device shown in Figure 2 by using a bank that yielded 1,000 firings per second. Thus, if a thousand units, such as illustrated in Figure 2, are provided and each unit is fired once per second, the thrust developed would be sufficient to propel vehicles of approximately 10 tons. Considering the dimension of each unit, the thrust obtained per unit area at a firing rate of one per second would be about 50 dynes/cm.$^2$.

If fine wire were used as the primary propellant it would be necessary to re-introduce the wire after each firing. Techniques for accomplishing this could be provided by a variety of techniques which will be evident to those skilled in the art. Or, a small button plasma gun could be provided for each device, and electrode or other material used as the propellant each cycle. Operation and firing would therefore continue to provide propulsion as long as sufficient propellant material remained.

It should thus be apparent that the embodiments shown are only exemfiplary and that various modifications can be made in construction and arrangement within the scope of the present invention as defined in the appended claims.

What is claimed is:

1. A plasma propulsion system adapted for operation substantially in a vacuum environment, said system comprising in combination: first and second oppositely disposed electrodes, means applying an electrical voltage between said electrodes, a metal member serving as a "backstrap" adjacent the path between said electrodes and disposed on the side of said electrodes opposite to the direction in which thrust is desired, means for introducing a plasma between said electrodes, said propulsion system being so constructed and arranged that the introduction of said plasma between said electrodes causes the electrical voltage between said electrodes to break down the gap therebetween, said "backstrap" being connected so that a substantial portion of the discharge current through said gap flows through said "backstrap," the forces acting on said plasma upon breakdown of said gap thereby causing acceleration of said plasma away from the vicinity of said electrodes in a direction substantially away from said "backstrap."

2. A plasma propulsion system adapted for operation substantially in a vacuum environment, said system comprising in combination: first and second oppositely disposed electrodes, means applying an electrical voltage between said electrodes, a metal member serving as a "backstrap" adjacent the path between said electrodes and disposed on the side of said electrodes opposite to the direction in which thrust is desired, third and fourth oppositely disposed electrodes substantially at right angles to said first and second electrodes, a fine wire connected between said third and fourth electrodes and passing through an area in the vicinity of said first and second electrodes, means for applying an electrical voltage between said third and fourth electrodes which when applied will vaporize and heat said wire to the plasma state, said propulsion system being so constructed and arranged that the vaporization and heating of said wire to the plasma state causes the electrical voltage between said first and second electrodes to break down the gap therebetween, said "backstrap" being connected in series with said first and second electrodes and the applied voltage thereto so that the discharge current through said gap flows through said "backstrap," the forces acting on said plasma upon breakdown of said gap thereby causing acceleration of said plasma away from the vicinity of said first and second electrodes in a direction substantially away from said "backstrap."

3. A plasma propulsion system adapted for operation substantially in a vacuum environment, said system comprising in combination: first and second oppositely disposed electrodes, a fine wire connected between said electrodes, a metal member serving as a "backstrap" adjacent the path between said electrodes and disposed on the side of said electrodes opposite to the direction in which thrust is desired, means for applying an electrical voltage between said electrodes which when applied will vaporize and heat said wire to the plasma state and initiate a discharge between said electrodes, said "backstrap" being connected in series with said electrodes and said electrical voltage source so that the discharge current through said gap flows through said "backstrap," the forces acting on said plasma when said electrical voltage is applied thereby causing acceleration of said plasma away from the vicinity of said first and second electrodes in a direction substantially away from said "backstrap."

4. A plasma propulsion system adapted for operation substantially in a vacuum environment, said system comprising in combination: first and second oppositely disposed electrodes, means applying an electrical voltage between said electrodes, means for introducing a plasma between said electrodes, said propulsion system being so constructed and arranged that the introduction of said plasma between said electrode causes the electrical voltage between said electrodes to break down the gap therebetween, and means connected in said system so that a substantial portion of the discharge current through said gap flows in a path adjacent the path between said electrodes and on the side of said electrodes opposite to the direction in which thrust is desired, the forces acting on said plasma upon breakdown of said gap thereby causing acceleration of said plasma away from the vicinity of said electrodes.

No references cited.